(12) United States Patent
West

(10) Patent No.: US 7,559,290 B2
(45) Date of Patent: Jul. 14, 2009

(54) PET BED OVERLAY, SYSTEM, AND RETROFIT KIT

(76) Inventor: Paula Lee West, 7219 Lanham La., Edina, MN (US) 55439

( * ) Notice: Subject to any disclaimer, the term of this patent is extended or adjusted under 35 U.S.C. 154(b) by 171 days.

(21) Appl. No.: 11/601,902

(22) Filed: Nov. 20, 2006

(65) Prior Publication Data

US 2007/0044722 A1    Mar. 1, 2007

Related U.S. Application Data

(60) Provisional application No. 60/842,743, filed on Sep. 7, 2006.

(51) Int. Cl.
  *A01K 1/015* (2006.01)
(52) U.S. Cl. .................................... 119/28.5
(58) Field of Classification Search ............... 119/28.5; 5/417, 420, 496; D30/118
See application file for complete search history.

(56) References Cited

U.S. PATENT DOCUMENTS

| | | | | |
|---|---|---|---|---|
| 1,412,064 A * | 4/1922 | Sanford | ......................... | 5/112 |
| 1,820,284 A * | 8/1931 | Mills | ......................... | 119/28.5 |
| 2,729,831 A * | 1/1956 | Fuld et al. | ....................... | 5/494 |
| 3,205,514 A * | 9/1965 | Pietrangeli | ..................... | 5/484 |
| 4,703,529 A * | 11/1987 | Mann | ............................. | 5/494 |
| 5,097,552 A * | 3/1992 | Viesturs | ......................... | 5/691 |
| 5,099,531 A * | 3/1992 | Schmier | ........................ | 5/692 |
| 5,158,258 A * | 10/1992 | McFadzean | ................. | 248/500 |
| 5,188,059 A * | 2/1993 | Rice | ............................ | 119/28.5 |
| 5,509,718 A * | 4/1996 | Neary | .................... | 297/228.12 |
| 5,537,952 A | 7/1996 | Devlin | | |
| D376,875 S * | 12/1996 | Glickstein | .................. | D30/118 |
| 5,588,393 A | 12/1996 | Heilborn | | |
| 5,662,065 A * | 9/1997 | Bandimere et al. | ........ | 119/28.5 |
| 5,727,266 A * | 3/1998 | Pang | .............................. | 5/490 |
| 5,794,285 A * | 8/1998 | Burch | ........................... | 5/497 |
| 5,826,537 A | 10/1998 | Heilborn | | |
| D406,923 S * | 3/1999 | Simpkins | ................... | D30/118 |
| 5,970,544 A * | 10/1999 | Kardell | ......................... | 5/499 |
| 6,044,794 A | 4/2000 | Raitanen et al. | | |

(Continued)

OTHER PUBLICATIONS

Start Revolution—Designer Pet Beds—Product Catalog, Nov. 8, 2006 (date retrieved from the Internet), 2 pages, (Retrieved from the Internet <URL: http://www.startrevolution.com/SearchREsult.aspx?CategoryID=14).

(Continued)

*Primary Examiner*—Yvonne R. Abbott

(57) ABSTRACT

A pet bed system has an overlay removably secured to a pet bed. The pet bed has a top surface for supporting a recumbent pet within a supportive area, a basal area, and a transition area between the supportive area and the basal area. The overlay has a protective area generally disposed upon the supportive area of the top surface, and a plurality of extension areas extending from the protective area and overlapping the transition area of the pet bed while exposing portions of the top surface. The pet bed and the extension areas may be provided with mating attachment members to removably secure the overlay to the pet bed. A great variety of different types of attachment members are suitable. Alternatively, the extension areas may be joined by an elastic section to removably secure the overlay to the pet bed by compression. The overlay may be washable for reuse or disposable. A kit may be used to retrofit the overlay to a pet bed.

22 Claims, 9 Drawing Sheets

U.S. PATENT DOCUMENTS

| | | | |
|---|---|---|---|
| 6,209,486 B1 * | 4/2001 | Reynolds | 119/28.5 |
| 6,286,456 B1 * | 9/2001 | Michaelis | 119/28.5 |
| D455,872 S * | 4/2002 | Sturgis | D30/118 |
| 6,435,133 B1 * | 8/2002 | Wayne, Jr. | 119/28.5 |
| 6,513,178 B1 * | 2/2003 | Kelly et al. | 5/110 |
| 6,574,810 B2 * | 6/2003 | Mangiaracina | 5/655 |
| 6,966,275 B2 * | 11/2005 | Whitehill | 119/28.5 |
| 7,185,604 B2 * | 3/2007 | Holte | 119/28.5 |
| 7,340,788 B1 * | 3/2008 | Traub | 5/697 |
| 2003/0163870 A1 * | 9/2003 | Porter et al. | 5/490 |
| 2004/0163603 A1 | 8/2004 | Newton | |
| 2004/0216680 A1 * | 11/2004 | Lamstein | 119/28.5 |
| 2005/0028277 A1 * | 2/2005 | Gordon et al. | 5/420 |
| 2005/0224000 A1 | 10/2005 | Holte | |
| 2006/0060147 A1 * | 3/2006 | Appelhans | 119/28.5 |
| 2006/0272581 A1 * | 12/2006 | Dunn et al. | 119/28.5 |
| 2007/0056100 A1 * | 3/2007 | Stewart | 5/497 |
| 2007/0062456 A1 * | 3/2007 | Pace | 119/28.5 |
| 2007/0137583 A1 * | 6/2007 | Angus | 119/28.5 |
| 2007/0256244 A1 * | 11/2007 | Ashley | 5/655 |

OTHER PUBLICATIONS

U.S. Appl. No. 60/842,743 for Paula Lee West entitled "Pet Bed Overlay", filed Sep. 7, 2006.

U.S. Appl. No. 29/265,713 for Paula Lee West entitled "Pet Bed Overlay", filed Sep. 7, 2006.

U.S. Appl. No. 29/265,715 for Paula Lee West entitled "Pet Bed Overlay", filed Sep. 7, 2006.

* cited by examiner

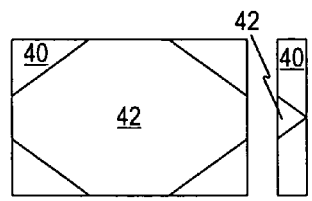
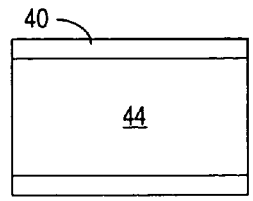
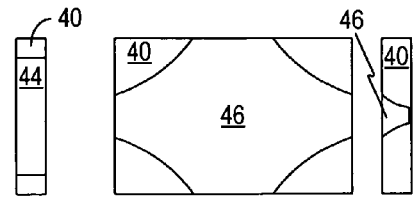
FIG. 3  FIG. 4  FIG. 5
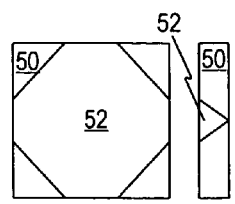
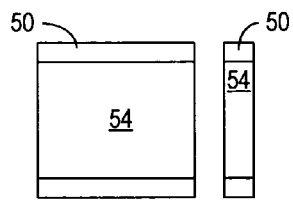
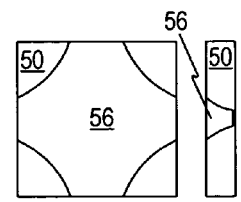
FIG. 6  FIG. 7  FIG. 8
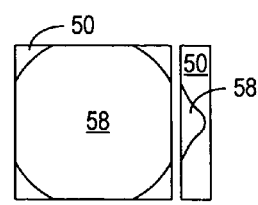
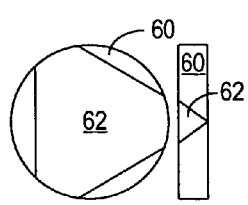
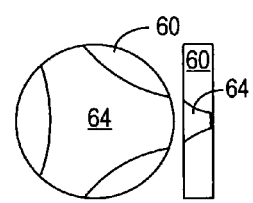
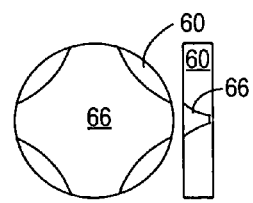
FIG. 9  FIG. 10  FIG. 11  FIG. 12

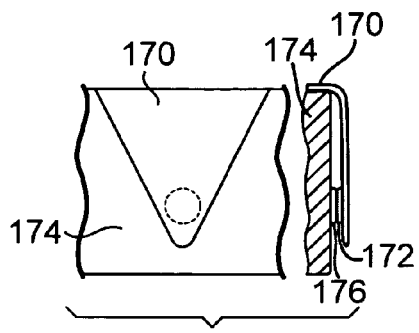
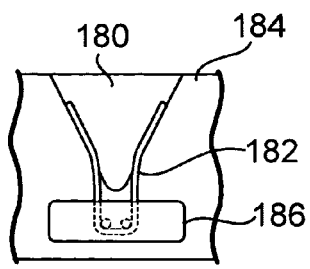
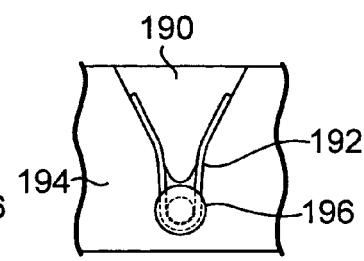
Fig. 29    Fig. 30    Fig. 31
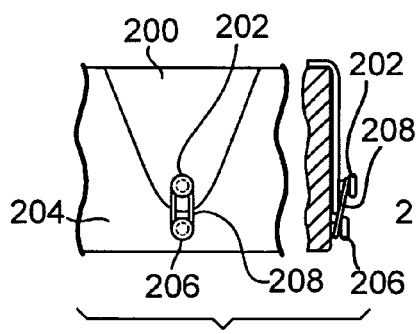
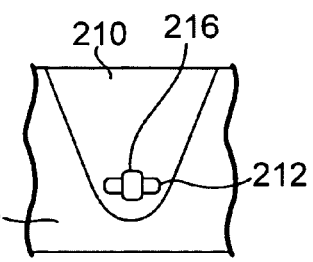
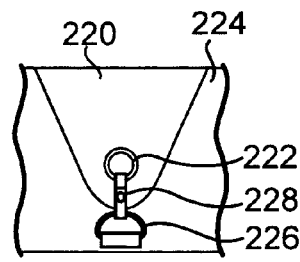
Fig. 32    Fig. 33    Fig. 34
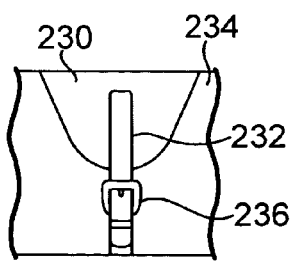
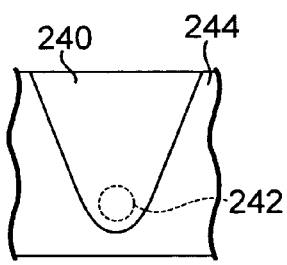
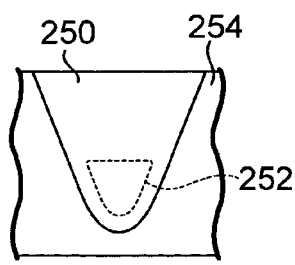
Fig. 35    Fig. 36    Fig. 37

PET BED OVERLAY, SYSTEM, AND RETROFIT KIT

CROSS-REFERENCE TO RELATED APPLICATION

This application claims the benefit of U.S. Provisional Patent Application Ser. No. 60/842,743 filed on Sep. 7, 2006 (Paula Lee West, Pet Bed Overlay), which is hereby incorporated herein in its entirety by reference thereto.

BACKGROUND OF THE INVENTION

1. Field of the Invention

The present invention relates to pet accessories, and more particularly to an overlay or cover for a pet bed.

2. Description of the Related Art

Pet beds are available in a variety of shapes, sizes and configurations. Since pet beds inevitably become soiled with use, various different approaches have been developed to maintain cleanliness. In some types of pet beds, the material upon which the pet rests is non-absorbent and smooth to shed moisture, soil and hair. Materials commonly used for this purpose include various synthetic materials and various natural materials that have been chemically treated to render them resistant to moisture, dirt and hair. Unfortunately, synthetic materials may not be comfortable for some pets or may not have appearance, texture, wear or other properties desired by the pet owner, and materials that have been chemically treated may irritate some pets. Another approach is to place cushioning material into a washable case, which may be provided with a zipper or other closure mechanism to keep the cushioning material in place. Unfortunately, such cases are awkward to remove for laundering and to install after laundering, and have limited aesthetic appeal.

BRIEF SUMMARY OF THE INVENTION

Despite some success with these various approaches, an approach is desired that is protective of the pet bed, even while being easy to remove and install in some embodiments, allowing features of the pet bed to be visible or accessible in some embodiments, and facilitating the use of a wider variety of materials in some embodiments.

One embodiment of the present invention is a pet bed system comprising a pet bed and an overlay. The pet bed has a top surface for supporting a recumbent pet within a supportive area, a basal area, and a transition area between the supportive area and the basal area. The overlay comprises a protective area generally disposed upon the supportive area of the top surface; and a plurality of extension areas extending from the protective area and overlapping the transition area of the pet bed while exposing portions of the top surface. The overlay is removably secured to the pet bed through the extension areas. Preferably, the overlay has three or more extension areas.

Another embodiment of the present invention is a pet bed system comprising a pet bed having a supportive surface and a plurality of first attachment members disposed at or proximate to the sides thereof; and an overlay disposed upon the pet bed. The overlay comprises a protective area resting upon the supportive surface, the protective area being smaller than the supportive surface for exposing at least a portion of the supportive surface; at least three extension areas extending from the protective area and folded over and partially covering respective sides of the pet bed, the extension areas being smaller than the respective sides for exposing portions of the respective sides; and a plurality of second attachment members respectively disposed at the extension areas and respectively engaged with the first attachment members.

Another embodiment of the present invention is an overlay for a pet bed having a top surface for supporting a recumbent pet within a supportive area. The overlay comprises a disposable sheet of flexible water-absorbent material having a central protective area for resting upon the supportive area when the overlay is in alignment with the pet bed, and a plurality of extension areas extending from the protective area; and a plurality of first attachment members respectively associated with the extension areas. If desired, at least the central protective area of the sheet comprises a water-resistant or waterproof backing material.

Another embodiment of the present invention is an overlay for a rectangular or oval pet bed, comprising a generally rhomboid sheet having a generally octagonal central protective area and four extension areas extending from the protective area at ninety degree intervals; and a plurality of attachment members respectively associated with the extension areas.

Another embodiment of the present invention is an overlay for a circular pet bed, comprising a generally triangular sheet having a generally hexagonal central protective area and three extension areas extending from the protective area at one hundred twenty degree intervals; and a plurality of attachment members respectively associated with the extension areas.

Another embodiment of the present invention is an overlay for a pet bed having a supportive surface. The overlay comprises a protective area for resting upon the supportive surface when the overlay is in alignment with the pet bed; at least three extension areas extending from the protective area for folding over and partially covering respective sides of the pet bed when the overlay is in alignment with the pet bed; and a plurality of attachment members respectively disposed at the extension areas. The protective area is smaller than the supportive surface for exposing at least a portion of the supportive surface, and the extension areas are smaller than the respective sides for exposing portions of the respective sides.

Another embodiment of the present invention is a kit for retrofitting a pet bed having a top surface for supporting a recumbent pet within a supportive area. The kit comprises an overlay, a plurality of second attachment members, and mounting materials for retrofitting the second attachment members to the pet bed. The overlay comprises a sheet of flexible material having a central protective area for resting upon the supportive area when the overlay is in alignment with the pet bed, and at least three extension areas extending from the protective area; and a plurality of first attachment members respectively associated with the extension areas. Each of the first attachment members and each of the second attachment members are respective members of a mating pair.

Another embodiment of the present invention is a kit for retrofitting a pet bed having a supportive surface for an overlay. The kit comprises a plurality of first attachment members; mounting materials for retrofitting the first attachment members to the pet bed; and an overlay. The overlay comprises a protective area for resting upon the supportive surface when the overlay is in alignment with the pet bed; at least three extension areas extending from the protective area for folding over and partially covering respective sides of the pet bed when the overlay is in alignment with the pet bed; and a plurality of second attachment members respectively disposed at the extension areas, the first attachment members being respectively engageable with the second attachment members. The protective area is smaller than the supportive surface for exposing at least a portion of the supportive surface, and the extension areas are smaller than the respective sides for exposing portions of the respective sides.

BRIEF DESCRIPTION OF THE SEVERAL VIEWS OF THE DRAWINGS

FIGS. 3-16 are top and edge plan views of various shapes of pet beds and overlays suitable therefor.

FIGS. 25-29 are side plan and cross-sectional views of pet beds showing various attachment mechanisms for the various overlays.

FIGS. 30-31 are side plan views of pet beds showing various attachment mechanisms for the various overlays.

FIG. 32 is a side plan and cross-sectional view of a pet bed showing a particular attachment mechanism for the various overlays.

FIGS. 33-37 are side plan views of pet beds showing various attachment mechanisms for the various overlays.

DETAILED DESCRIPTION OF THE INVENTION, INCLUDING THE BEST MODE

Figure 1:
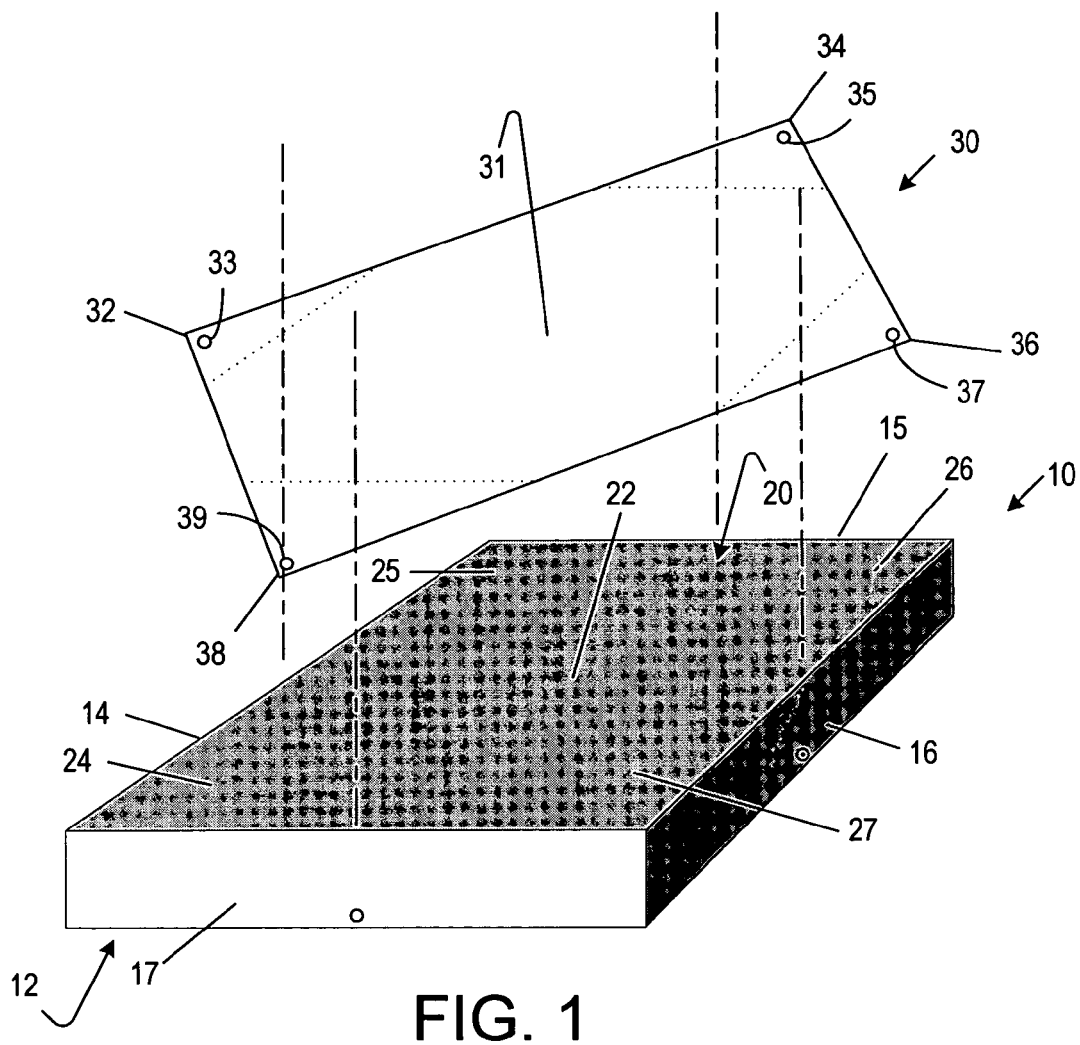
FIG. 1 is a corner perspective view of an overlay in an unfolded condition positioned above a pet bed.
Figure 2:
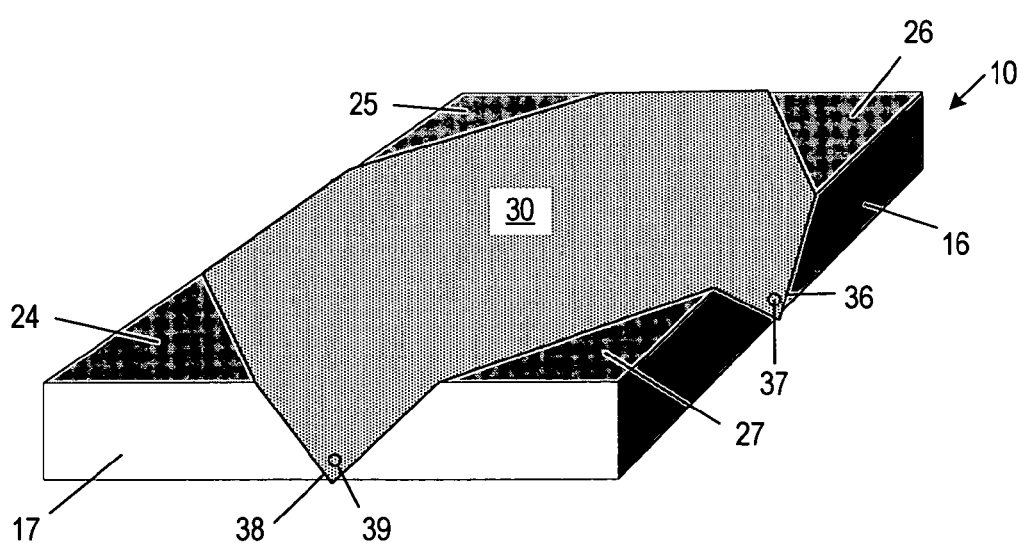
FIG. 2 is a corner perspective view of an overlay in an installed condition upon a pet bed.
Figure 13:
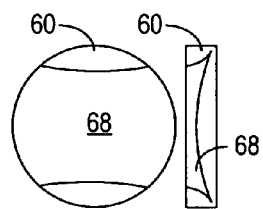
Figure 14:
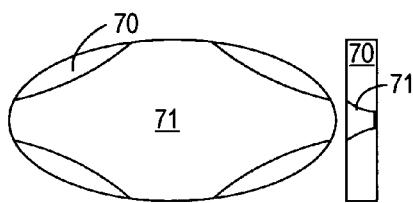
Figure 15:
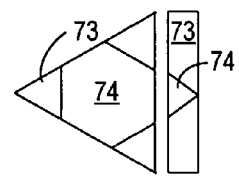
Figure 16:
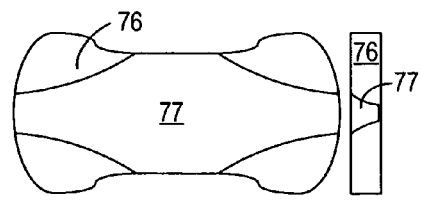

Various aspects of a pet bed overlay are shown for a simple rectangular pet bed in the corner perspective drawings of FIGS. 1 and 2, with FIG. 1 showing the various elements before assembly and FIG. 2 showing the various elements after assembly. While pet beds may be provided in a variety of shapes and configurations, FIGS. 1 and 2 show a simple rectangular pet bed 10 having an top supportive surface 20 for supporting a recumbent pet, a basal surface 12 (hidden), and four sides, two long sides 14 and 16, and two short sides 15 and 17. An overlay 30 is positioned on the pet bed 10, and illustratively has a parallelogram shape, specifically a rhombus, so as to cover the entire central region 22 of the supportive surface 20 of the pet bed 10 with a protective area 21, while revealing or exposing peripheral corner portions 24, 25, 26 and 27 of the supportive surface 20 and the sides 14, 15, 16 and 17. The relative shape and size of the supportive surface 20 and the overlay 30 are shown in FIG. 1, before the overlay 30 is attached to the pet bed 10. The overlay 30 is attached to the pet bed 10 illustratively by having four extension areas, namely corners 32, 34, 36 and 38 of the rhombus shaped overlay shown in FIG. 1, respectively attached generally in the center of the sides 14, 15, 16 and 17 using any suitable attachment mechanism, generally represented by generic attachment mechanisms 33, 35, 37 and 39.

Figure 45:
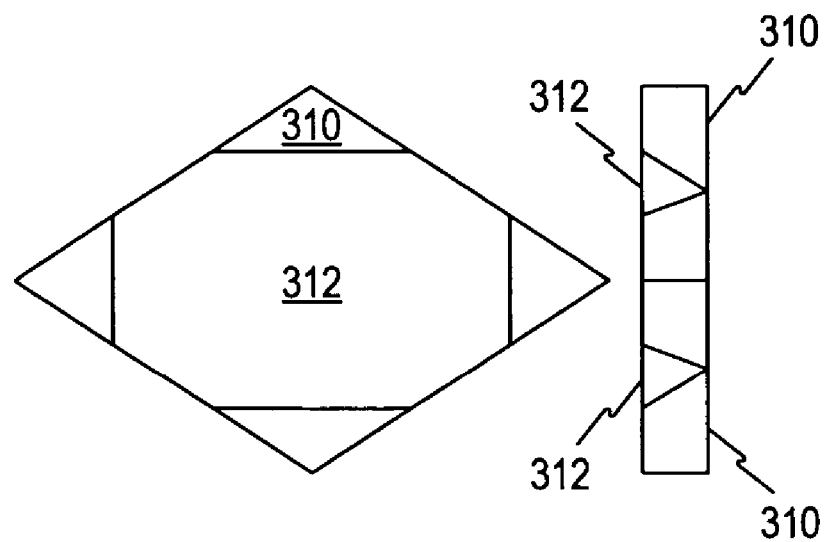
FIG. 45 is a top and edge plan view of a rectangular overlay installed upon a rhomboid pet bed.
Figure 46:
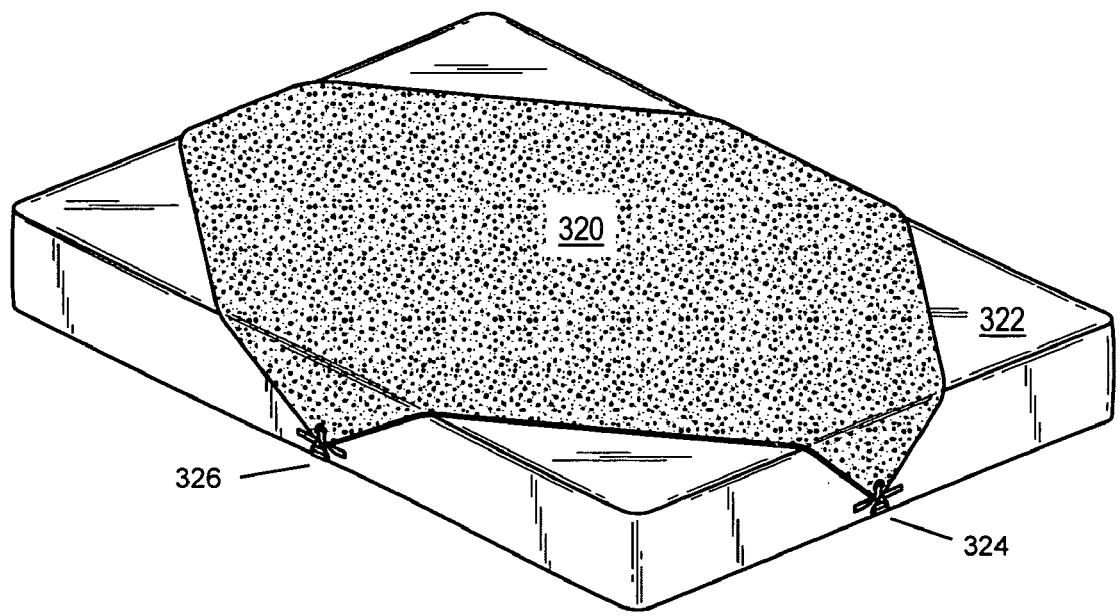
FIG. 46 is a corner perspective view of a rhombus-shaped overlay in an installed condition upon a rectangular pet bed.
Figure 47:
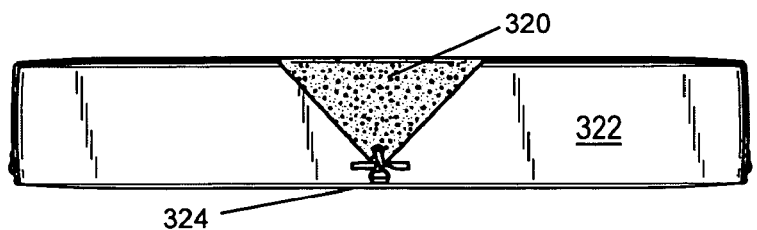
FIG. 47 is a plan view of a short side of the pet bed of FIG. 46.
Figure 48:
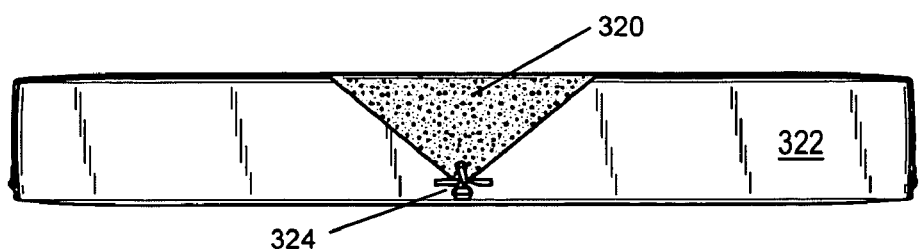
FIG. 48 is a plan view of a long side of the pet bed of FIG. 46.

FIG. 45 shows another corner perspective view of a rhombus-shaped overlay 320 installed on a rectangular pet bed 322 and attached using a tie/grommet/D-ring arrangement (see, for example, FIG. 21), with the tie being tied in a bow as shown at 324 and 326. Short side and long side views are shown in FIGS. 46 and 47 respectively. The pet bed may be any suitable size depending on the size of the pet. For a large dog, for example, a suitable size is 36 inches wide, by 45 inches long, by 6 inches high.

The pet bed may be made of an enormous range of materials to satisfy the functional and aesthetic requirements of the pet owner. Although pet owners tend to prefer materials that are moisture and soil resistant and that do not attract pet hair, these are not essential requirements for all pet owners. Suitable synthetic materials include acetate, acrylic, elastoester, lyocell, microfibers, nylon, PLA fiber, polyester, polyolefin, rayon, spandex and triacetate. Suitable natural materials include leather, fur, angora, camel, alpaca, llama, vicuna, cashmere, cotton, hemp, linen, mohair, plant fibers, ramie, silk and wool. The naturally materials may be treated with various natural oils and processes or synthetic chemicals to improve their moisture and soil resistance and to avoid attracting pet hair.

The pet bed may range from firm and supportive to flexible and deformable, depending on the requirements of the pet owner and the type and health of the pet. An example of a firm and supportive pet bed would be the use of thick cloths and hides such as leather and pig skin surrounding a resilient core, wherein the pet bed may be provided with structural edges between the sides, top and bottom of the pet bed obtained by braided, piped seams, internal or external framing, and the like. An example of a flexible and deformable pet bed would be a pillow-like pet bed formed by stuffing a case with down, polyfill, slick fiber, foam pieces, curled hair, Hallofil, polyester wrap, cotton, and the like. Alternatively, the pet bed may be tight with no margins. Other suitable pet beds include encased foam blocks, air-inflated casings, water-filled casings, springs and fabric, and the like.

An enormous variety of materials are suitable for the overlay, depending on the requirements of the pet owner. Generally, the materials suitable for the pet bed may also be suitable for the overlay. However, generally pet owners may prefer the material used for the overlay to be soft and water-absorbing, and capable of capturing and retaining hair. Where the overlay is intended to be reused, preferably the overlay material is reasonably durable and washable. Where the overlay is intended to be disposed of after use, the overlay preferably is made of a low cost material, including reinforced paper fiber. Particularly suitable materials for the overlay include sheepskin, terrycloth, velvet, velour, canvas, cotton, polyester, fleece, vinyl, Astroturf, washable Sherpa, microfiber, denim, and various cotton-polyester blends. The overlay may be provided with a water-proof or water-resistant backing to prevent seepage of water and moisture through to the underlying pet bed.

The overlay may be made of the same material or different materials suitable for the various areas of the overlay. The protective area of the overlay that rests upon the top surface of the pet bed may be of a material that is soft and water-absorbing and capable of capturing and retaining hair, while the extension areas may be of a different material to achieve other desired purposes.

An illustrative choice of material for the rectangular pet bed 10 having the properties of durability, moisture and soil resistance, and great aesthetic appeal would be thick, treated pigskin stitched along the edge seams, which encases a pillow-like core for loft and pliability. An illustrative choice of material for the overlay 30 would be sheepskin.

The pet bed may be any desired shape and contour. Illustrative shapes are rectangular, square, triangular, rhomboid, oval, round, heart-shaped, crescent-shaped, bone-shaped, face-shaped, animal shaped, and so forth. The top surface may have any desired surface contour, including planar, concave, convex, rippled (like an air mattress, for example), multi-conical, and so forth. The basal surface typically is generally flat, suitably contoured, or pliable to provide at least some measure of stability to the pet bed. One common type of rectangular pet bed has essentially planar top and basal surfaces and four side panels in the transition area between the top surface and the basal surface. Nearly the entire top surface may be supportive of the recumbent pet. Typically seams are provided in the transition area, one seam between the top surface and the top of the side panels, and the other seam between the basal surface and the bottom of the side panels. Another common type of pet bed is similar to a conventional pillow in having a top surface and a basal surface which may be separate sheets of material joined at a seam, or which may be different areas of a single sheet of material that is folded over at some edges and may be seamed at other edges. Typically the central area of the top surface is primarily supportive for the recumbent pet. In this type of pet bed, side panels are absent from the transition area, and the top surface and the basal surface typically are quite convex in the transition area near the edges. The pet bed may include additional integrated structures for pet comfort and safety, or for the convenience of the pet owner. Examples include bolsters, frames, springs, air chambers, and the like.

The shape of the overlay is generally dependent on the shape of the pet bed, but varies depending on the desired geometry, the amount of exposure desired for the pet bed, the amount of overlap with the sides of the pet bed, and whether top, side or bottom attachment is used. FIGS. 3, 4 and 5 show top and side plan views of a rectangular pet bed 40 with different overlays 42, 44 and 46. Overlay 42 has a parallelogram shape and is secured to the pet bed 40 by attaching the corners generally to the center area of the respective sides of the pet bed 40. Overlay 44 has a rectangular shape and is secured to the pet bed 40 by attaching the corners generally to two opposite sides of the pet bed 40 near the corners of the pet bed 40. Overlay 46 has an approximate parallelogram shape but with curved rather than straight edges, and is secured to the pet bed 40 by attaching the corners generally to the center area of the respective sides of the pet bed 40. The curvature may be concave as shown in FIG. 5, or may be convex or compound as desired. FIGS. 6, 7 and 8 show top and side plan views of a square pet bed 50 with different overlays 52, 54 and 56. Similar to the overlay 42, overlay 52 has a parallelogram shape and is secured to the pet bed 50 by attaching the corners generally to the center area of the respective sides of the pet bed 50. Similar to the overlay 42, overlay 54 has a rectangular shape and is secured to the pet bed 50 by attaching the corners generally to two opposite sides of the pet bed 50 near the corners of the pet bed 50. Similar to the overlay 46, overlay 56 has an approximate parallelogram shape but with curved rather than straight edges, and is secured to the pet bed 50 by attaching the corners generally to the center area of the respective sides of the pet bed 50. The curvature may be concave as shown in FIG. 8, or may be convex (not shown) or compound (not shown) as desired. FIGS. 6, 7 and 8 show top and side plan views of a square pet bed 50 with different overlays 52, 54 and 56. FIG. 9 shows top and side plan views of the square pet bed 50 with a generally circular overlay 58, from which four sections extend at ninety degree intervals for securing the overlay 58 to the four sides of pet bed 50.

FIGS. 10, 11, 12 and 13 show top and side plan views of a round pet bed 60 with different overlays 62, 64, 66 and 68. The overlay 62 is generally triangular, and is attached at three equally circumferentially spaced points to the edge of the pet bed 60. The overlay 64 is generally triangular but with curved rather than straight edges, and is attached at three equally circumferentially spaced points to the edge of the pet bed 60. The overlay 66 is generally square but with curved rather than straight edges, and is attached at four spaced-apart points to the edge of the pet bed 60 to expose four areas of the pet bed 60. The overlay 68 is generally rectangular but with curved rather than straight edges, and is attached at four spaced-apart points to the edge of the pet bed 60 to expose two areas of the pet bed 60. With curved pet beds, providing elastic pleats or using elastic material in the overlay, and particularly in the sections of the overlay that extend upon the edge and side of the pet bed, may improve conformity of the overlay with the curved surfaces.

Other illustrative shapes are shown in FIGS. 14, 15, 16 and 45, and include oval pet bed 70 with a roughly parallelogram curved-edge overlay 71, triangular pet bed 73 with a triangular overlay 74, bone-shaped pet bed 76 with a roughly parallelogram curved-edge overlay 77, and rhomboid pet bed 310 with a rectangular overlay 312.

Figure 17:
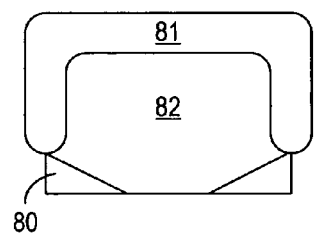
FIGS. 17 and 18 are top plan views of two different shapes of pet beds with bolsters and overlays.
Figure 18:
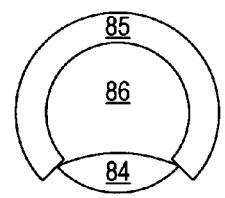

FIG. 17 shows a rectangular pet bed 80 with bolster 81 and overlay 82. FIG. 18 shows a round pet bed 84 with bolster 85 and overlay 86.

Figure 19:
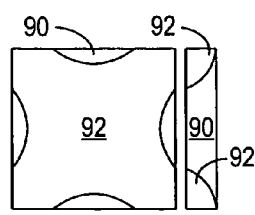
FIGS. 19-20 are top and edge plan views of various shapes of pet beds and overlays suitable therefor.
Figure 20:
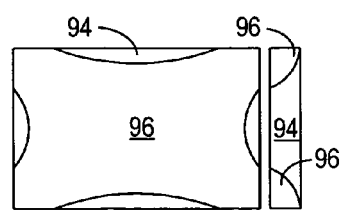

Particularly for square and rectangular pet beds where the size of the pet is large relative to the size of the pet bed, a pet may tend to lie along the diagonal of the pet bed. Overlays suitable for such situations are shown in FIGS. 19 and 20. FIG. 19 shows a square pet bed 90 in which an overlay 92 that is roughly shaped like a four-pointed star is attached to the corners of the pet bed 90 using pockets, straps, elastic, or any other suitable attachment technique. This technique reveals the middle area of the sides of the pet bed 90, rather than the corner areas. FIG. 20 shows a rectangular pet bed 94 in which an overlay 96 that is roughly shaped like an elongated four-pointed star is attached to the corners of the pet bed 94 using any suitable attachment technique.

While the protective area and the exposed portions of the top surface may be arranged to present a "balanced" and pleasing appearance of two essentially congruent parts about a line of symmetry, a line of symmetry need not be present. Moreover, while a pleasing appearance may also be achieved by having the exposed portions of generally the same shape and size, albeit of different rotational orientation (in two-dimensional space, three-dimensional space, or both), the exposed portions may be of different shape or size, if desired.

Figure 21:
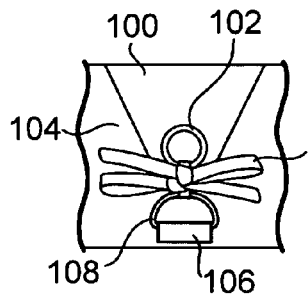
FIGS. 21-24 are side plan views of pet beds showing various attachment mechanisms for the various overlays.

A variety of attachment techniques are suitable to secure overlays to pet beds, and include ornamental and utilitarian designs. A simple, effective and ornamental technique is shown in FIG. 21, in which an overlay 100 is provided with an eyelet, illustratively grommet 102, illustratively in a corner thereof. Illustratively, the grommet 102 is reinforced with metal or plastic, although generally speaking, eyelets rimmed with materials such as cord, fabric or leather for reinforcement are also suitable. A pet bed 104 includes a ring 108, illustratively a D-ring, that rotates within a sleeve 106 that is stitched or otherwise secured to the side thereof. To secure the overlay 100 to the pet bed 104, the grommet 102 is brought near to the ring 108. A strip of decorative cord, cloth, fabric or leather lace, thin supple leather, or other suitable material 109 is passed through the grommet 102 and the ring 108 and tied. Any desired knot may be used, including a bow (as shown), square knot, and so forth.

Figure 22:
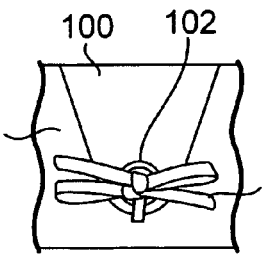

FIG. 22 shows another technique for attaching the overlay 100 to a pet bed 110. The overlay 100 is provided with a grommet 102 illustratively in a corner thereof. Each side of the pet bed 110 includes a strip of decorative cord, cloth, fabric or leather lace, thin supple leather, or other suitable material 111 that is stitched or otherwise secured to the side thereof. To secure the overlay 100 to the pet bed 110, the grommet 102 is brought near to the strip 111, which is passed through the grommet 102 and tied. Any desired knot may be used, including a bow (as shown), square knot, and so forth. Alternatively, the strip of material may be sewn or otherwise secured to the overlay (not shown), and tied to a D-ring, grommeted flap of material, stud or other attachment mechanism (not shown) provided on the side of the pet bed.

Figure 23:
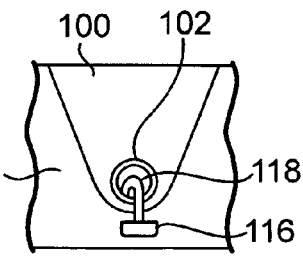

FIG. 23 shows another technique for attaching the overlay 100 to a pet bed 114. The overlay 100 is provided with a grommet 102 illustratively in a corner thereof. The pet bed 114 includes a hook 118 of any suitable type that rotates within a sleeve 116 that is stitched or otherwise secured to the side thereof. Suitable types of hooks include swivel snaps, clasps, open hooks, and so forth. To secure the overlay 100 to the pet bed 114, the grommet 102 is brought near to the hook 118, which is passed through the grommet 102.

Figure 24:
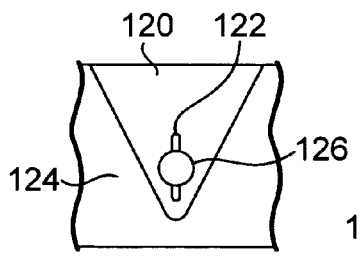

FIG. 24 shows another technique for attaching an overlay 120 to a pet bed 124. The overlay 120 is provided with a button hole 122 or other type of eyelet illustratively in a corner thereof. The pet bed 124 includes a button 126 of any suitable type that is stitched or otherwise secured to the side thereof. To secure the overlay 120 to the pet bed 124, the button hole 122 is brought near to the button 126, which is passed through the button hole 122.

Figure 25:
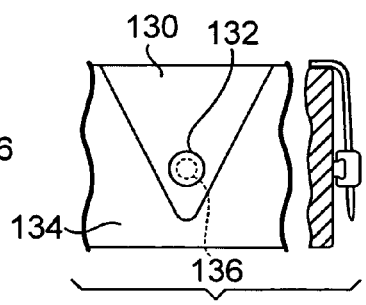

FIG. 25 shows another technique for attaching an overlay 130 to a pet bed 134. The overlay 130 is provided with a snap hood 132 illustratively in a corner thereof. The pet bed 134 includes a snap post 136 that is stitched or otherwise secured to the side thereof. To secure the overlay 130 to the pet bed 134, the snap hood 132 is pressed against the snap post 136.

Figure 26:
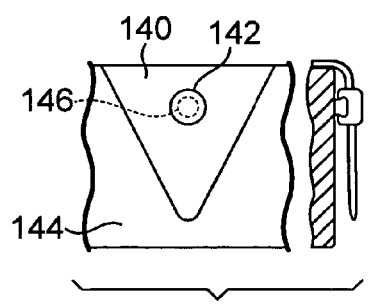

It will be appreciated that while the corner of the overlay and the lower side of a pet bed are suitable locations for an attachment mechanism, other locations may be used. FIG. 26 shows another technique for attaching an overlay 140 to a pet bed 144. The overlay 140 is provided with a snap hood 142 illustratively near but spaced away from a corner thereof. The pet bed 144 includes a snap post 146 that is stitched or otherwise secured to the side thereof, near the top. To secure the overlay 140 to the pet bed 144, the snap hood 142 is pressed against the snap post 146.

Figure 27:
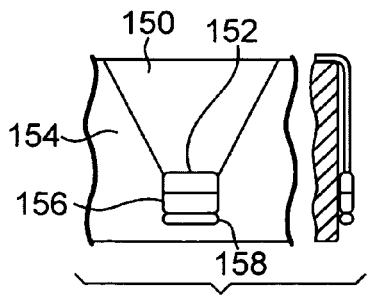

FIG. 27 shows another technique for attaching an overlay 150 to a pet bed 154. The overlay 150 is provided with a latch section 152 illustratively in a corner thereof. The pet bed 154 includes a latch section 156 of any suitable type that rotates within a sleeve 158 that is stitched or otherwise secured to the side thereof. To secure the overlay 150 to the pet bed 154, the latch section 152 and the mating latch section 156 are brought into engagement.

Figure 28:
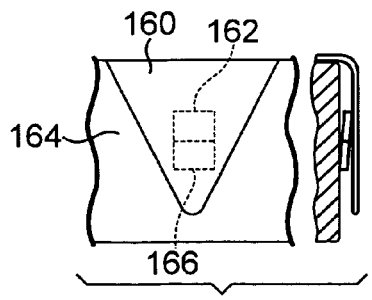

It will be appreciated that while the corner of the overlay and the lower side of a pet bed are suitable locations for an attachment mechanism, other locations may be used. FIG. 28 shows a technique similar to the technique of FIG. 27 for attaching an overlay 160 to a pet bed 164, but one in which the attachment mechanism is hidden from view. The overlay 160 is provided with a latch section 162 illustratively near but spaced away from a corner thereof, and stitched or otherwise secured to the overlay 160. The pet bed 164 includes a latch section 166 of any suitable type that is stitched or otherwise secured to the side thereof, near the top. To secure the overlay 160 to the pet bed 164, the latch section 162 and the mating latch section 166 are brought into engagement. Since the latch section 162 and the mating latch section 166 lie under a corner of the overlay 160, and so are not visible after the overlay 160 is secured to the pet bed 164.

FIG. 29 shows the use of two small magnets for attaching an overlay to a pet bed. A magnet 176 is mounted to the side of a pet bed 174 and the magnet 172 is mounted to the overlay 170. The magnets may be of various sizes and shapes, with one suitable illustrative type of magnet being 0.75 inch circular.

FIG. 30 shows the use of a toggle for attaching an overlay to a pet bed. A toggle 186 is mounted to the side of a pet bed 184, and the overlay 180 is provided with a loop 182 of material. The overlay 180 may be attached by looping the loop 182 over the toggle 186. Suitable toggle materials include plastic, wood, horn, bone, metal, woven, leather, and so forth.

FIG. 31 shows the use of a capped stud such as a knob, rivet, or button mounted on a short post, for attaching an overlay to a pet bed. A stud 196 is mounted to the side of a pet bed 194, and an overlay 190 is provided with a loop 192 of material. The overlay 190 may be attached by looping the loop 192 over the stud 196. The stud 196 may be capped in any suitable manner, including with an ornamental concho, denim, brass, ceramic, and so forth.

FIG. 32 shows the use of multiple capped studs such as knobs, rivets, or buttons mounted on short posts, for attaching an overlay to a pet bed. Studs 202 and 206 are mounted respectively to an overlay 200 and to the side of a pet bed 204. The overlay 200 may be attached by positioning the two studs 202 and 206 next to each other, and then looping a strip 208 of decorative cord, cloth, fabric or leather lace, thin supple leather cord, or other suitable material around each of the studs 202 and 206 and tying the ends thereof. Any desired knot (not shown) may be used, including a bow, square knot, and so forth. Alternatively, a loop of elastic material such as elastic cloth or a rubber band, may be slipped over each stud. The studs may be capped in any suitable manner, including with ornamental conchos, denim, brass, ceramic, and so forth.

FIG. 33 shows the use of a rotatable clasp of the type commonly used in handbags for attaching an overlay to a pet bed. Illustratively, a clasp is provided with a turn button 216, illustratively rectangular, which is mounted to the side of a pet bed 214, and an overlay 210 is provided with an eyelet 212 that matches the shape of the turn button 216. The overlay 210 may be attached by slipping the eyelet 212 over the turn button 216, and rotating the turn button 216 by ninety degrees.

FIG. 34 shows the use of a leather band very much like a wristband with pre-attached snaps, for attaching an overlay to a pet bed. An overlay 220 is provided with an eyelet, illustratively a grommet 222, illustratively in a corner thereof. A pet bed 224 includes a ring 226, illustratively a D-ring, that rotates within a sleeve stitched or otherwise secured to the side thereof. To secure the overlay 220 to the pet bed 224, the grommet 222 is brought near to the ring 226, a leather strap 228 is passed through the grommet 222 and the ring 226, and the ends are secured together using, illustratively, pre-attached snaps. The strap 228 may be made with materials other than leather and with connectors other than snaps, including belt buckles.

FIG. 35 shows the use of leather straps stitched or otherwise secured to the overlay and pet bed for attaching the overlay to the pet bed. The strap segments illustratively are joined by a belt buckle, although other joining mechanisms such as snaps may be used instead. An overlay 230 is provided with one of the strap segments, preferably a tongue segment 232 without a buckle. The other segment 236 having a buckle is provided on the side of the pet bed 234. To secure the overlay 230 to the pet bed 234, the tongue segment 232 is passed through the buckle on the buckle segment 236.

FIG. 36 shows the use of Velcro fasteners for attaching an overlay to a pet bed. Mating Velcro fasteners 242 are provided on an overlay 240 and on the side of a pet bed 244. To secure the overlay 240 to the pet bed 244, the Velcro fasteners 242 are brought into contact with one another. Although the Velcro fasteners are shown as small round buttons, they may be any desired shape and size, including triangular, rectangular, oval, and square. Moreover, more than one pair of Velcro fasteners may be used at each attachment point.

FIG. 37 shows the use of "sticky" areas for attaching the overlay to the pet bed. The material in the sticky area may be a temporary adhesive, or may be an interface film such as a polymer hydrogel or a material sheet coated with a temporary adhesive. To secure an overlay 250 to a pet bed 254, respective sticky areas 252 at an edge of a pet bed 254 and on an overlay 250 are provided at an attachment point, and the overlay 250 is pressed against the edge of the pet bed 254 at the attachment point.

Figure 38:
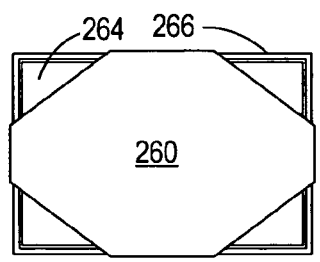
FIGS. 38 and 39 are top and cross-sectional views of an overlay installed upon a pet bed using an indirect attachment technique.
Figure 39:

Auxiliary structures may be used to indirectly secure an overlay to a pet bed. FIG. 38 is a top plan view and FIG. 39 is a cross-sectional view of a pet bed 264 that is surrounded by a frame 266 that conforms to the peripheral shape of the pet bed 264. Both the pet bed 264 and the frame 266 lie on a floor, such that the frame 266 may be dropped into place without necessarily lifting or otherwise disturbing the pet bed 264. An overlay 260 is attached to the frame 266 at points corresponding to the attachment sites described with respect to FIGS. 1-28, for example, thereby effectively if indirectly attaching the overlay 260 to the pet bed 264. Any suitable attachment technique may be used to attach the overlay 260 to the frame 266. The frame preferably is rigid or semi-rigid, with suitable materials including metal, plastic, wood, reed, hard rubber, and so forth. If used with rigid pet beds, a variety of other frame materials may be used, including belts of cloth or elastic, for example, that wrap around the pet bed.

Figure 40:
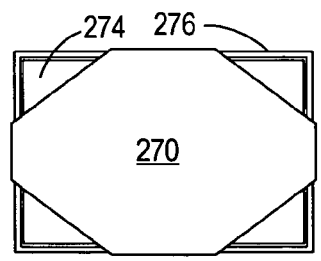
FIGS. 40 and 41 are top and cross-sectional views of an overlay installed upon a pet bed using another indirect attachment technique.
Figure 41:
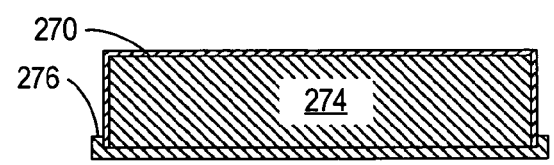

The frame may be varied to include portions that extend under the pet bed, whether partially or entirely, in effect forming a tray within which the pet bed lies. FIG. 40 is a top plan view and FIG. 41 is a cross-sectional view of a pet bed 274 that lies in a tray 276, and is attached to the tray at points at or near the outer periphery by any suitable attachment technique. Although shown with a raised peripheral edge, the edge may be omitted if desired such that the overlay 270 maintains alignment between the pet bed 274 and the tray 276. Suitable materials for the tray 276 include metal, plastic, wood, woven reeds, cardboard, hard rubber, and so forth, and the tray 276 may be solid, closed weave, open weave, net-like, and so forth.

Figure 42:
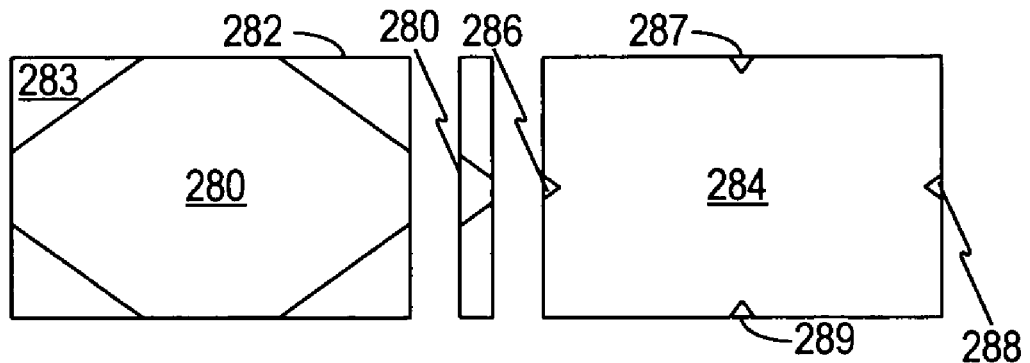
FIG. 42 is a top, side and bottom plan view of an overlay installed upon a pet bed using a bottom attachment technique.
Figure 43:
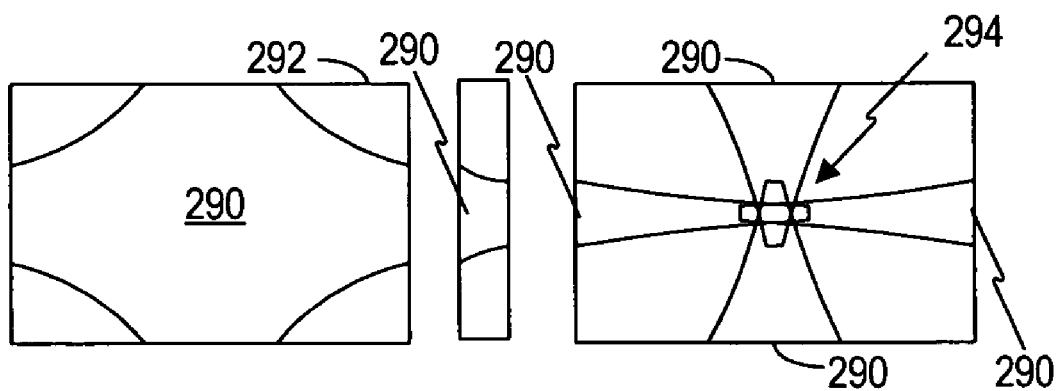
FIG. 43 is a top, side and bottom plan view of an overlay installed upon a pet bed using another bottom attachment technique.

While attachment of an overlay to the side of a pet bed is preferred, the overlay may if desired be attached to the top or the bottom of the pet bed near the edge, using any suitable attachment technique including the techniques shown in FIGS. 21-41. FIG. 42 shows an overlay 280 that is attached to a pet bed 282 using any suitable attachment technique at attachment points 286, 287, 288 and 289 on the bottom surface 284 of the pet bed 282. The top surface of the pet bed 282 is shown at 283. FIG. 43 shows an overlay 290 that is attached to a pet bed 292 using any suitable attachment technique at attachment points located in the center of the bottom of the pet bed. The attachment points, generally indicated at 294, may be on the corners of the overlay 290, or may be on some combination of the back center of the pet bed 292 and the corners of the overlay 290. One illustrative technique uses mating Velcro fasteners on opposing corners of the overlay 290, such that one of the opposing pairs of corners of the overlay 290 may be attached to one another first, then the other of the opposing pairs of corners of the overlay may be attached to one another and crisscross the first pair.

Figure 44:
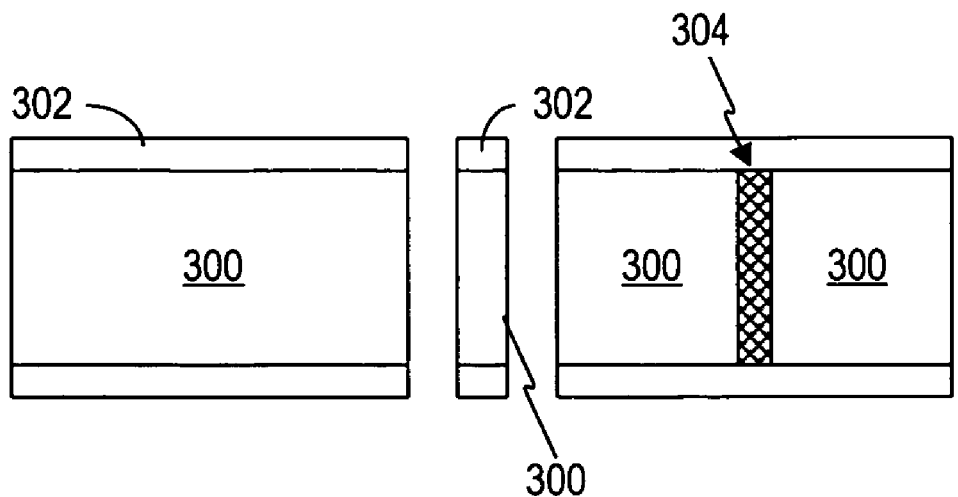
FIG. 44 is a top, side and bottom plan view of an overlay installed upon a pet bed using compression.

FIG. 44 shows an overlay 300 that is attached to a pet bed 302 by compression. An elastic section 304 joins the corners or ends of the overlay 300, so that the overlay 300 may be slipped on or off of the pet bed 302 as desired.

The bottom of the pet bed may be provided with projecting members such as rivets, rubber feet, and the like for various purposes, such as to stabilize the pet bed, prevent the pet bed from sliding on certain surfaces, and so forth. The use of projecting members may be particularly advantageous to prevent the pet bed from rocking when the overlay is attached at the bottom of the pet bed. If desired, the projecting members may also be used as attachment members for the overlay.

Certain types of attachment members may be retrofitted to existing pet beds using adhesive, stitching, adapter screws and plates, rivets, and so forth. The attachment members, mounting materials, and overlay may be packaged and sold as a kit for retrofitting existing pet beds. Adhesive-backed Velcro is a particularly suitable for inclusion in a retrofit kit.

Optionally, a small pocket may be provided on the outside or inside of the overlay, preferably at one of the extension areas. The pocket may be made of fabric and sewn on. The pocket may be any desired size, the dimensions of about three inches by five inches, about two and a half inches square, and so forth being illustrative.

Many overlay materials naturally encourage the pet to lie on the overlay rather than on any exposed surfaces of the pet bed. This behavior may be further encouraged by placing a small amount of an essential oil or other scent near the edge of the protective area, or even on one or more of the overlay extension areas, so that the pet may tend to rest his head near or upon the scented area with his body upon the protective area. If the pet bed has a major axis, the essential oil or other scent may be placed at locations on the edges of the protective area or on the overlay extension areas that lie along the major axis. The essential oil or other scent may be applied manually from a container or applicator, with a drop of two generally being suitable depending on the strength of the scent, or may be built into the overlay in the nature of a patch or other type of dispenser. Suitable essential oils include lavender, spruce, cedarwood, ylang ylang, patchouli, white angelica, fir, and various combinations thereof.

The description of the invention and its applications as set forth herein is illustrative and is not intended to limit the scope of the invention. Variations and modifications of the embodiments disclosed herein are possible, and practical alternatives to and equivalents of the various elements of the embodiments would be understood to those of ordinary skill in the art upon study of this patent document. These and other variations and modifications of the embodiments disclosed herein may be made without departing from the scope and spirit of the invention.

The invention claimed is:

1. A pet bed system comprising:
a pet bed having a top surface for supporting a recumbent pet within a supportive area, a basal area, and a transition area between the supportive area and the basal area; and
an overlay comprising:
a protective area generally disposed upon the supportive area of the top surface; and
at least three extension areas extending from the protective area and overlapping the transition area of the pet bed while leaving uncovered some of the top surface and most of the transition area;
the overlay being removably secured to the pet bed through the extension areas.

2. The pet bed system of claim 1 wherein:
the extension areas terminate within the transition area;
the overlay further comprises a plurality of first attachment members respectively associated with the extension areas within the transition area;
the pet bed comprises a plurality of second attachment members disposed in the transition area; and
the first attachment members and the second attachment members are respectively coupled to removably secure the overlay to the pet bed.

3. The pet bed system of claim 2 wherein:
the pet bed comprises:
a first sheet of flexible material, the top surface being a surface of the first sheet;
a second sheet of flexible material, the basal area being a surface of the second sheet;
a side area;
a first peripheral seam joining the side area to the first sheet;
a second peripheral seam joining the side area to the second sheet; and
a resilient core disposed between the first and second sheets;
the supportive area is generally coterminous with the top surface;
the transition area includes the side area and the first and second peripheral seams; and
the second attachment members are disposed in proximity to the second peripheral seam.

4. The pet bed system of claim 2 wherein:
the pet bed comprises:
a first sheet of flexible material, the top surface being a surface of the first sheet;
a second sheet of flexible material, the basal area being a surface of the second sheet;
a peripheral seam joining the first and second sheets; and
fill material disposed between the first and second sheets;
the supportive area is generally centered in the top surface away from the peripheral seam;
the transition area includes the peripheral seam and a portion of the top sheet between the supportive area and the peripheral seam; and
the second attachment members are disposed in proximity to the peripheral seam.

5. The pet bed system of claim 2 wherein each of the first attachment members and each of the second attachment members are respective members of a mating pair, the mating pair being a grommet and ring with material strip, grommet and hook, button-hole and button, snap hood and snap post, male and female latch sections, first and second magnets, material loop and toggle, material loop and capped stud, first stud and second stud with material strip, eyelet and turn button, first and second bands with respective snaps, tongue and buckle, first and second Velcro pieces, or first and second sticky regions.

6. The pet bed system of claim 1 wherein:
the extension areas terminate within the basal area;
the overlay further comprises a plurality of first attachment members respectively associated with the extension areas within the basal area;
the pet bed comprises a plurality of second attachment members disposed in the basal area; and
the first attachment members and the second attachment members are respectively coupled to removably secure the overlay to the pet bed.

7. The pet bed system of claim 1 wherein:
the extension areas terminate in proximity to one another within the basal area;
the overlay further comprises a first attachment member and a second attachment member respectively associated with the extension areas within the basal area; and
the first attachment member and the second attachment member are coupled to removably secure the overlay to the pet bed.

8. The pet bed system of claim 1 wherein the extension areas are elastically joined to one another within the basal area to removably secure the overlay to the pet bed.

9. The pet bed system of claim 1 wherein the exposed portions of the top surface are as essentially congruent parts about a line of symmetry bisecting the protective area.

10. The pet bed system of claim 1 wherein:
the protective area is disposed relative to the top surface for exposing only a first portion, a second portion, and a third portion of the top surface;
the first, second and third portions have respective essentially identical shapes; and
the first and second portions are disposed about a line of symmetry passing through the protective area and the third portion.

11. The pet bed system of claim 1 wherein:
the protective area is disposed relative to the top surface for exposing only a first portion, a second portion, a third portion, and a fourth portion of the top surface;
the first, second, third and fourth portions have respective essentially identical shapes; and
the first and second portions and the third and fourth portions are disposed about a line of symmetry passing through the protective area.

12. The overlay of claim 1 wherein:
the top surface is in essentially rectangle;
the overlay is essentially rhomboid;
the protective area is essentially octagonal and disposed relative to the top surface for exposing a first triangular corner portion, a second triangular corner portion, a third triangular corner portion, and a fourth triangular corner portion of the top surface;
the first, second, third and fourth corner portions have respective essentially identical shapes; and
the first and second corner portions and the third and fourth corner portions are disposed about a line of symmetry passing through the protective area.

13. The pet bed system of claim 1 wherein the overlay is washable.

14. The pet bed system of claim 1 wherein the overlay is disposable.

15. The pet bed system of claim 1 wherein the overlay further comprises:
a disposable sheet of flexible water-absorbent material, the protective area being centrally located therein; and a plurality of first attachment members respectively associated with the extension areas.

16. The overlay of claim 15 wherein at least the central protective area of the sheet comprises a water-resistant or water-proof backing material.

17. The overlay of claim 15 wherein the each of the first attachment members is a grommet, a button-hole, a snap hood, a latch section, a magnet, a material loop, a stud, an eyelet, a band having a snap, a tongue segment, a Velcro piece, or a sticky region.

18. The pet bed system of claim 1 wherein:
the pet bed is rectangular; and
the overlay comprises:
a generally rhomboid sheet having a generally octagonal central protective area and four extension areas extending from the protective area at ninety degree intervals; and a plurality of attachment members respectively associated with the extension areas.

19. The pet bed system of claim 1 wherein:
the pet bed is circular; and
the overlay comprises:
a generally triangular sheet having a generally hexagonal central protective area and three extension areas extending from the protective area at one hundred twenty degree intervals; and a plurality of attachment members respectively associated with the extension areas.

20. The pet bed system of claim 1 wherein:
the pet bed is oval; and
the overlay comprises:
a generally rhomboid sheet having a generally octagonal central protective area and four extension areas extending from the protective area at ninety degree intervals; and a plurality of attachment members respectively associated with the extension areas.

21. A kit for retrofitting a pet bed having a top surface for supporting a recumbent pet within a supportive area, a basal area, and a transition area between the supportive area and the basal area, comprising:

an overlay comprising:

a sheet of flexible material having a central protective area for resting upon the supportive area when the overlay is in alignment with the pet bed, and at least three extension areas extending from the protective area for leaving uncovered some of the top surface and most of the transition area; and a plurality of first attachment members respectively associated with the extension areas;

a plurality of second attachment members, each of the first attachment members and each of the second attachment members being respective members of a mating pair; and mounting materials for retrofitting the second attachment members to the pet bed.

22. The kit of claim 21 wherein the mating pair is a grommet and ring with material strip, a grommet and hook, buttonhole and button, snap hood and snap post, male and female latch sections, first and second magnets, material loop and toggle, material loop and capped stud, first stud and second stud with material strip, eyelet and turn button, first and second bands with respective snaps, tongue and buckle, first and second Velcro pieces, or first and second sticky regions.

* * * * *